United States Patent [19]
Malm

[11] 3,789,153
[45] Jan. 29, 1974

[54] CALL PARK CIRCUIT FOR AN AUTOMATIC TELEPHONE SWITCHING SYSTEM

[75] Inventor: Marvin Forest Malm, Milan, Tenn.

[73] Assignee: International Telephone and Telegraph Corporation, New York, N.Y.

[22] Filed: June 8, 1972

[21] Appl. No.: 260,846

[52] U.S. Cl. .................... 179/27 D
[51] Int. Cl. .................... H04q 3/64
[58] Field of Search .................... 179/27 D

[56] References Cited

UNITED STATES PATENTS

| | | | |
|---|---|---|---|
| 3,692,950 | 9/1972 | Lecoanet et al. | 179/27 D |
| 3,692,948 | 9/1972 | Warner | 179/18 FA |

*Primary Examiner*—Thomas W. Brown
*Attorney, Agent, or Firm*—C. Cornell Remsen, Jr.; James B. Raden; Delbert P. Warner

[57] ABSTRACT

In a telephone switching system in which automatic operator access is provided, a further system is provided to assure that incoming calls to an operator are treated on a first-come first-serve basis during periods of heavy traffic in which the operators are busy. This further system is minimized in size, in cost and in complexity according to the present invention through use of circuits which complete a single call when an operator becomes available.

10 Claims, 2 Drawing Figures

CALL PARK CIRCUIT FOR AN AUTOMATIC TELEPHONE SWITCHING SYSTEM

BACKGROUND OF THE INVENTION

1. Field of the Invention

The present invention relates to an incoming call park circuit, or call queueing circuit, for telephone switching systems. It relates particularly to a call park circuit, which "parks" or holds calls requiring operator assistance which have been attempted at times when the operator positions are busy. The call park circuit monitors the operator positions and automatically routes the calls to an operator whose position becomes available to receive a call for completion in a pre-established order of priority. The order of priority may preferably be on a first-come first-serve basis.

2. Description of the Prior Art

Known systems for parking or holding calls until an operator becomes available employ a special switching circuit. When the operator's circuits are busy, incoming calls to the operators are routed to the special switching circuit. When an operator becomes available, the connection to the special circuit is released and another connection is made to the operator. This prior art requires a special extra switching circuit and requires that two connections must be made to service each delayed call.

SUMMARY OF THE INVENTION

In view of the foregoing, it is an object of the present invention to provide a call park system, or queueing system, which avoids the necessity for special switching circuits requiring completion of a plurality of connections when an attempt to call an operator is met initially with a busy indication.

The invention relates to an automatic telephone switching system in which automatic access to an operator is provided. It relates further to a system for assuring that attempted calls to the operators during busy periods will be serviced on a first-come first-serve basis. The system includes a plurality of linear ramp generators which provide a zero output in their quiescent states. When an attempt is made to call an operator, one of the ramp generators is started. The operated ramp generator provides a voltage which rises at some fixed rate, such as one volt per second. The output of the ramp generator is supplied to a DC voltmeter and to a Longest Waiting Call Detector. The DC voltmeter is located at the chief operator's monitoring position to enable the chief operator to determine the length of time the waiting call has been held.

The circuit serving as a Longest Waiting Call Detector is coupled to receive ramp voltage from the ramp generator. The Longest Waiting Call Detector produces an output voltage similar in form to that of the ramp generator. A ground circuit essential to the operation of the Longest Waiting Call Detector is completed through Call Type relay contacts and Class Busy relay contacts. If an operator is available at this time, a circuit fron the Longest Waiting Call Detector is completed and an Operator Demand Relay is energized to complete the call to an operator. If all the operators are busy, all the Class Busy relay contacts will be open and the Longest Waiting Call Detector will be held inoperative. During this period, the ramp voltage supplied by the Ramp Generator will be applied to a corresponding voltmeter to provide a reading to the chief operator indicating the length of time the call has been waiting. As soon as an operator becomes available, the corresponding Class Busy relay contact will close to enable the Longest Waiting Call Detector to send out a signal. This signal is used to operate an operator demand relay and enable completion of a call to the operator.

DETAILED DESCRIPTION OF THE INVENTION

Figure 1:
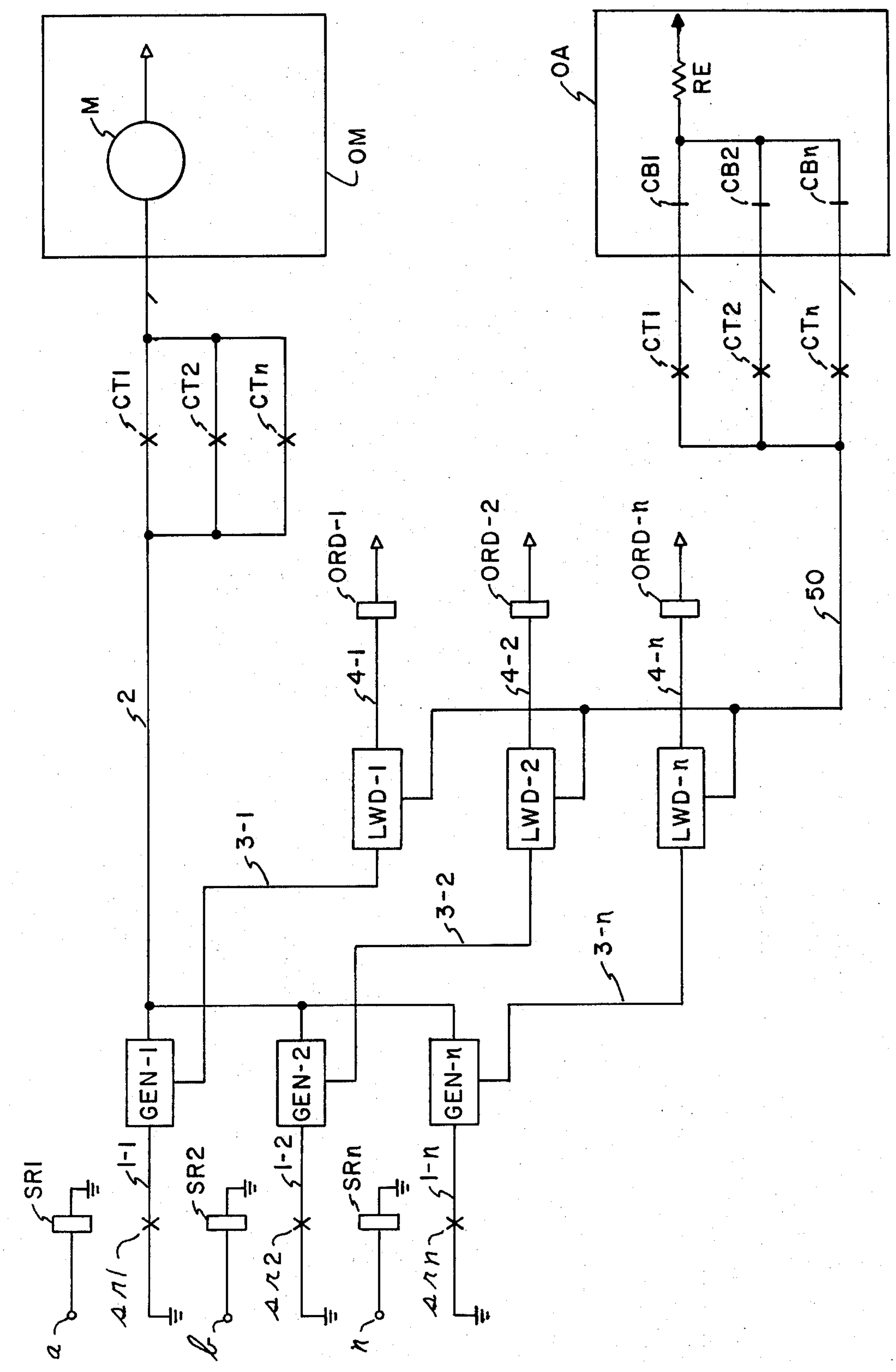

Turn now to FIG. 1 for a further description of an embodiment of the invention. The circuits indicated by blocks in FIG. 1 are accessed through a line 1–1, 1–2 . . . **1–*n* by closure of open circuits, indicated by "make" contacts *sr*1, *sr*2 . . . *srn* of Start Relays SR1, SR2 . . . SR*n*. It will be recognized, of course, that SR1, SR2 . . . SR*n* and *sr*1, *sr*2 . . . *srn* may be electronic elements rather than electro-mechanical. Completion of a circuit through *sr*1, *sr*2 . . . *srn***, it will be understood, is under control of a conventional switching system or other known means operable over terminals *a*, *b* . . . *n* and outside the scope of the present invention.

Closure of a ground connection starts a zero offset linear ramp generator at GEN–1, GEN–2 . . . **GEN–*n*. The operator ramp generator provides a ramp voltage having one volt rise per second in an exemplary embodiment. The generated ramp voltage is applied over line 2 and over corresponding closed contacts of the operator call type contacts CT1, CT2 . . . CT*n*** to a DC voltmeter M forming part of a chief operator's monitor circuit OM. The voltmeter is calibrated to provide a time indication in seconds as the linear ramp voltage rises. The meter will therefore make available to the chief operator an indication of the waiting call time on each operated circuit. Additional meters coupled through call type contacts may be used to indicate the status of a variety of call types, if desired.

The longest waiting call detectors at LWD1, LWD2 . . . LWDn use the output voltage of the corresponding ramp generator over lines 3–1, 3–2 . . . **3–*n* as a reference voltage. When one call at a time comes in with call type contacts closed and operator class busy contacts CB1, CB2 . . . CB*n* closed, indicating that operators are available, a Longest Waiting Detector is energized. An operator demand signal is then transmitted by the Longest Waiting Detector Call circuit over one of the lines 4–1, 4–2, . . . 4–*n* to the corresponding operator demand relay ODR1, ODR2 . . . ODR*n***.

When a call for an operator comes in and the operator circuits in the Operator Access Control OA are all busy, the operator class busy relay contacts CB1, CB2 . . . **CB*n*** will all be opened, preventing completion of a circuit from the Longest Waiting Call Detector to RE and permitting the corresponding linear ramp generator to run until one of the operators becomes accessible to receive the call.

Figure 2:
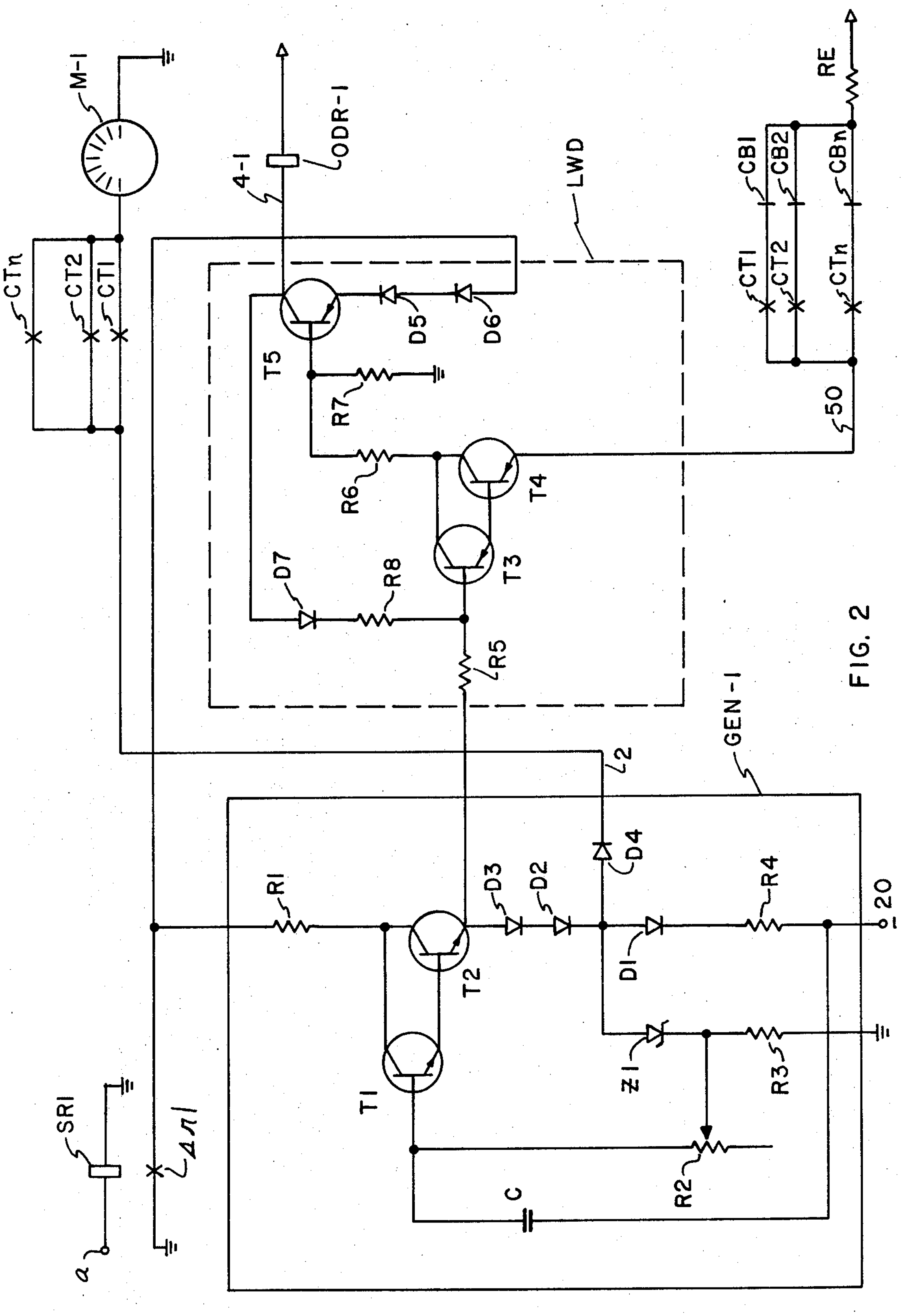

FIG. 2 is a more detailed presentation of circuits shown in block diagram form in FIG. 1. The operation of the linear ramp generator GEN–1 will be described first. In the idle state, a negative supply voltage (–35 V) at terminal 20 is applied across Capacitor C and over resistors R2 and R3 to attempt to charge C to the value of the negative supply voltage. However, the voltage is "clamped" through the base-emitter junctions of T1 and T2, the diodes D1, D2 and D3 and resistor R4. This assures that the voltage on line 2 at the output side of diode D4 is essentially at zero with respect to the minus 35 volt supply voltage.

When contacts *sr*–1 are closed, a "Darlington" circuit including the transistors T1 and T2 begins to conduct and the capacitor C is no longer "clamped." The capacitor C begins to charge via R2 and R3. Transistors T1 and T2 drive R4 in an emitter-follower configuration. The voltage on line 2 at the output side of D4 follows the charge rate of C, starting at −35 volts and going positive. In a particular exemplary circuit, the RC time constant is chosen so that the charging rate is one volt per second. The output from D4 is applied over line 2 and any closed call type relay contacts CT1, CT2 . . . CTn to the meter M, which is calibrated to indicate elapsed waiting time in seconds. The zener diode Z1 maintains a constant voltage across R2, since it is referenced back to the emitter circuit. This assures a constant charge current for C and therefore assures a linear charge rate.

The Longest Waiting Call Detector LwD–1 uses the output of the ramp generator GEN–1 as a reference voltage. The transistors T3 and T4 form a Darlington stage and are connected in an emitter-follower configuration over line 50 which is common to all circuits via call type relay contacts CT1, CT2 . . . CT*n* and operator class busy relay contacts CB1, CB2 . . . CB*n*.

When one call at a time comes in through closure of sr1 and operators are available, the call is immediately switched through. This happens when a call relay (not shown) closes one or more of the contacts CT1, CT2 . . . CT*n*, connecting the emitter of T4 to the common emitter resistor RE over the corresponding one of normally closed call busy contacts CB1, CB2 . . . CB*n*. Saturation bias is then supplied via resistor R5 for T3 and T4. This causes T5 to turn "on" via R6 and supply voltage for operation of the operator demand relay ODR–1. The operator is then connected to receive the call by known means outside the scope of this invention.

Assume now that all the operators are busy and that several calls come in during a given period. Each ramp generator will begin to operate when its associated start relay operates. As a consequence of starting in a random fashion as calls are started, each generator will probably be at a different voltage level when an operator becomes available.

When an operator becomes available, the corresponding operator class busy relay closes and connects the resistor RE to the emitters of the corresponding transistors T4 in all the "parked" circuits. The detector citcuit LWD with the highest ramp voltage will operate its operator demand relay ODR and the call will be connected to the available operator. All other LWD circuits will be reverse biased at this time and remain nonconductive. Diode D7 and resistor R8 provide positive feedback so the selected circuit is clamped in to prevent stealing. That is, in the event two LWD's are close together in terms of operating voltage levels and one is selected, change in the selection is prevented.

While the principles of the invention have been described above in connection with specific apparatus and applications, it is to be understood that this description is made only by way of example and not as a limitation on the scope of the invention.

I claim:

1. A call park circuit for automatic telephone switching systems, comprising first switch means operable in response to a call signal demanding an operator, means coupled to said first switch means and responsive to operation of said first switch means to generate a first demand voltage, longest waiting detector means coupled to receive said demand voltage, means coupling said longest waiting detector means to second switch means, said longest waiting detector means responding to said demand voltage and to an indication from said second switch means that an operator is available to provide a second demand voltage, and third switch means coupled to the longest waiting detector means responsive to said second demand voltage to institute a connection to an available operator.

2. A call park circuit as claimed in claim 1, in which said first demand voltage is employed as a source of time signals, indicator means are supplied to indicate time lapse, and means are provided coupling said indicator means to receive said first demand voltage.

3. A call park circuit as claimed in claim 1, in which the means to generate the first voltage includes a linear ramp generator, and the first demand voltage is a linear ramp voltage.

4. A call park circuit as claimed in claim 1, in which the means to generate a demand voltage includes a linear ramp generator providing a linear ramp voltage, said linear ramp generator including a transistor circuit responsive to ground potential applied over said first switch means to start conducting, a capacitor coupled in a network across said transistor circuit, said network providing a charging voltage to said capacitor, charging it at a linear rate, said charging voltage causing said transistor circuit to produce said linear ramp voltage.

5. A call park circuit as claimed in Claim 1, in which said means to generate a demand voltage includes a linear ramp generator, said linear ramp generator includes a transistor circuit formed by first and second transistors coupled in emitter follower configuration to the longest waiting detector means, means coupling the collector units of said transistors to said first switch means, means coupling the output emitter of said transistor circuit to a source of potential, and capacitor and resistor means coupling the input base circuit of said transistor circuit across said source of potential and ground circuits to provide a linearly variable input signal to drive said transistor circuit.

6. A call park circuit as claimed in claim 1, in which the means to generate a demand voltage includes a linear ramp generator providing a linear ramp voltage, said linear ramp generator includes a Darlington circuit responsive to the demand voltage to start conducting, a capacitor coupled in a neework across said Darlington circuit, said network providing a charging voltage to said capacitor, charging it at a linear rate,
said charging capacitor causing said Darlington circuit to produce said linear ramp voltage.

7. A call park circuit as claimed in claim 1, in which said means to generate a demand voltage includes a linear ramp generator,
said linear ramp generator includes a Darlington circuit coupled in emitter follower configuration to the longest waiting detector means,
means coupling the collector units of said Darlington circuit to said first switch means,
means coupling the emitter circuits of said Darlington circuit to a source of potential, and
capacitor and resistor means coupling the input base circuit of said Darlington circuit across said source of potential and ground circuits to provide a linearly variable input signal to drive said Darlington circuit.

8. A call park circuit as claimed in claim 7, in which a zener diode is coupled between the emitter follower circuit and the input base circuit of said Darlington circuit to provide a source of constant voltage.

9. A call park circuit as claimed in claim 1, in which the longest waiting detector means includes transistor circuits responsive to coincidence in said demand voltage and in a biasing voltage supplied over said second switch means to provide said second demand signal.

10. A call park circuit as claimed in claim 1, in which the indication from the second switch means that an operator is available is in the form of a bias potential, and
the longest waiting detector means includes transistor circuits responsive to coincidence in said demand voltage and in the bias potential over said second switch means to provide said second demand signal.

* * * * *